(12) United States Patent
Brown et al.

(10) Patent No.: US 12,710,132 B2
(45) Date of Patent: Aug. 18, 2026

(54) SMA ACTUATORS FOR OPTICAL IMAGE STABILISATION

(71) Applicant: CAMBRIDGE MECHATRONICS LIMITED, Cambridge (GB)

(72) Inventors: Andrew Benjamin Simpson Brown, Cambridge (GB); Stephen Matthew Bunting, Cambridge (GB); David Charles William Richards, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 1264 days.

(21) Appl. No.: 17/283,834

(22) PCT Filed: Oct. 10, 2019

(86) PCT No.: PCT/GB2019/052874
§ 371 (c)(1),
(2) Date: Apr. 8, 2021

(87) PCT Pub. No.: WO2020/074899
PCT Pub. Date: Apr. 16, 2020

(65) Prior Publication Data

US 2021/0382320 A1 Dec. 9, 2021

(30) Foreign Application Priority Data

Oct. 10, 2018 (GB) ..................................... 1816544

(51) Int. Cl.
*F16M 13/02* (2006.01)
*F03G 7/06* (2006.01)
(Continued)

(52) U.S. Cl.
CPC ............ *F16M 13/022* (2013.01); *F03G 7/06* (2013.01); *F03G 7/06143* (2021.08);
(Continued)

(58) Field of Classification Search
CPC ........ H04N 23/54; H04N 23/55; H04N 23/57; G03B 2205/0076
See application file for complete search history.

(56) References Cited

U.S. PATENT DOCUMENTS 4,829,767 A 5/1989 Mecca
2009/0052037 A1 2/2009 Wernersson
(Continued)

FOREIGN PATENT DOCUMENTS

CN 101860167 A 10/2010
CN 104335101 A 2/2015
(Continued)

OTHER PUBLICATIONS

GB Search Report dated May 2, 2019 of GB Application 1816544.9.
International Search Report and Written Opinion of PCT/GB2019/052875 dated Mar. 17, 2020.

*Primary Examiner* — Noam Reisner
(74) *Attorney, Agent, or Firm* — Van Hoven PC; Stefan D. Osterbur; Joshua Van Hoven

(57) ABSTRACT

Broadly speaking, embodiments of the present techniques provide shape memory alloy (SMA) actuation apparatus for moving a moveable component relative to a static component or support structure and along a notional primary axis. The SMA actuation apparatus may comprise a biasing element to resist motion of the moveable component in particular directions relative to the primary axis, or may comprise an arrangement of SMA actuator wires that provides the biasing function.

14 Claims, 6 Drawing Sheets

(51) Int. Cl.

| | |
|---|---|
| ***G02B 7/04*** | (2021.01) |
| ***G02B 7/08*** | (2021.01) |
| ***G02B 27/64*** | (2006.01) |
| ***G03B 13/34*** | (2021.01) |
| ***G03B 15/02*** | (2021.01) |
| ***H04N 13/221*** | (2018.01) |
| ***H04N 23/50*** | (2023.01) |
| ***H04N 23/55*** | (2023.01) |
| ***H04N 23/68*** | (2023.01) |

(52) U.S. Cl.
CPC ............... *F03G 7/066* (2021.08); *G02B 7/04* (2013.01); *G02B 7/08* (2013.01); *G02B 27/646* (2013.01); *G03B 13/34* (2013.01); *H04N 13/221* (2018.05); *H04N 23/50* (2023.01); *H04N 23/55* (2023.01); *H04N 23/68* (2023.01); *G03B 15/02* (2013.01); *G03B 2205/00* (2013.01); *G03B 2205/0076* (2013.01); *G03B 2205/0084* (2013.01); *H04N 23/687* (2023.01)

(56) References Cited

U.S. PATENT DOCUMENTS

| | | | | |
|---|---|---|---|---|
| 2010/0260492 | A1 | 10/2010 | Huang | |
| 2012/0019675 | A1 | 1/2012 | Brown | |
| 2013/0002933 | A1* | 1/2013 | Topliss | F03G 7/065 310/306 |
| 2013/0222685 | A1* | 8/2013 | Topliss | G03B 5/00 348/373 |
| 2017/0285362 | A1 | 10/2017 | Hu et al. | |
| 2017/0353634 | A1* | 12/2017 | Kim | H04N 23/45 |
| 2021/0131405 | A1* | 5/2021 | Miller | G03B 3/10 |

FOREIGN PATENT DOCUMENTS

| | | | |
|---|---|---|---|
| CN | 107272138 | A | 10/2017 |
| DE | 102010025222 | A1 | 12/2011 |
| JP | S6119981 | | 1/1986 |
| WO | 2011/104518 | A1 | 9/2011 |
| WO | WO 2017134456 | | 8/2017 |
| WO | WO 2017212262 | | 12/2017 |
| WO | WO 2018158590 | | 9/2018 |

* cited by examiner

SMA ACTUATORS FOR OPTICAL IMAGE STABILISATION

CROSS-REFERENCE TO RELATED APPLICATIONS

This application is a national stage application under 35 U.S.C. § 371 of International Application PCT/GB2019/052874, filed Oct. 10, 2019, which claims priority of GB Patent Application 1816544.9, filed Oct. 10, 2018. The disclosure of which are hereby incorporated by reference herein in their entireties.

The present application generally relates to a shape memory alloy (SMA) actuation apparatus for moving a moveable component relative to a support structure, and in particular to an SMA actuation apparatus comprising a biasing element to resist motion of the moveable component in particular directions.

In a first approach of the present techniques, there is provided a shape memory alloy (SMA) actuation apparatus comprising: a support structure; a moveable component moveable relative to the support structure; at least four SMA actuator wires connected between the moveable component and the support structure and arranged to move the moveable component relative to the support structure; and a biasing element to resist translation of the moveable component in a plane perpendicular to a notional primary axis.

In embodiments, two pairs of wires may provide a force on the moveable component with a component of force in opposite directions along the primary axis.

In embodiments, the biasing element may resist rotation of the moveable component about the primary axis.

The term "biasing element" is used herein to mean any element or component or mechanism for permitting or guiding movement of the moveable component in particular directions with respect to the primary axis or degrees of freedom, while limiting/resisting/constraining movement of the moveable component in other directions or other degrees of freedom. The biasing element may also be referred to herein as a "bearing element". The biasing element or bearing element may be a flexure, a rolling bearing, ball bearing, plain bearing, etc. In embodiments, the biasing element may comprise more than one biasing element, which may be of the same type or different.

In a second approach of the present techniques, there is provided a shape memory alloy (SMA) actuation apparatus for moving a telephoto lens, the apparatus comprising: a support structure; a moveable component moveable relative to the support structure; and eight SMA actuator wires connected between the moveable component and the support structure so that on contraction two groups of four SMA actuator wires provide a force on the moveable component with a component in opposite directions along a notional primary axis, while resisting translation of the moveable component in a plane perpendicular to the primary axis and resisting rotation of the moveable component about the primary axis.

In a third approach of the present techniques, there is provided an apparatus comprising an SMA actuation apparatus of the types described herein.

The apparatus may be any one of: a smartphone, a camera, a foldable smartphone, a foldable image capture device, a foldable smartphone camera, a foldable consumer electronics device, an image capture device, a 3D sensing device or system, a consumer electronics device, a mobile computing device, a mobile electronic device, a laptop, a tablet computing device, an e-reader (also known as an e-book reader or e-book device), a computing accessory or computing peripheral device (e.g. mouse, keyboard, headphones, earphones, earbuds, etc.), a security system, a medical device (e.g. an endoscope), a gaming system, a gaming accessory (e.g. controller, headset, a wearable controller, etc.), an augmented reality system, an augmented reality device, a virtual reality system, a virtual reality device, a wearable device, a drone (aerial, water, underwater, etc.), an autonomous vehicle, and a vehicle (e.g. an aircraft, a spacecraft, a submersible vessel, a car, etc.). It will be understood that this is a non-exhaustive list of example apparatus.

The SMA actuation apparatus described herein may be used in devices/systems suitable for, for example, image capture, 3D sensing, depth mapping, aerial surveying, terrestrial surveying, surveying in or from space, hydrographic surveying, underwater surveying, scene detection, collision warning, security, medical imaging, facial recognition, augmented and/or virtual reality, advanced driver-assistance systems in vehicles, autonomous vehicles, gaming, gesture control/recognition, and robotic devices.

Preferred features are set out in the appended dependent claims.

Implementations of the present techniques will now be described, by way of example only, with reference to the accompanying drawings, in which.

Figure 1A:
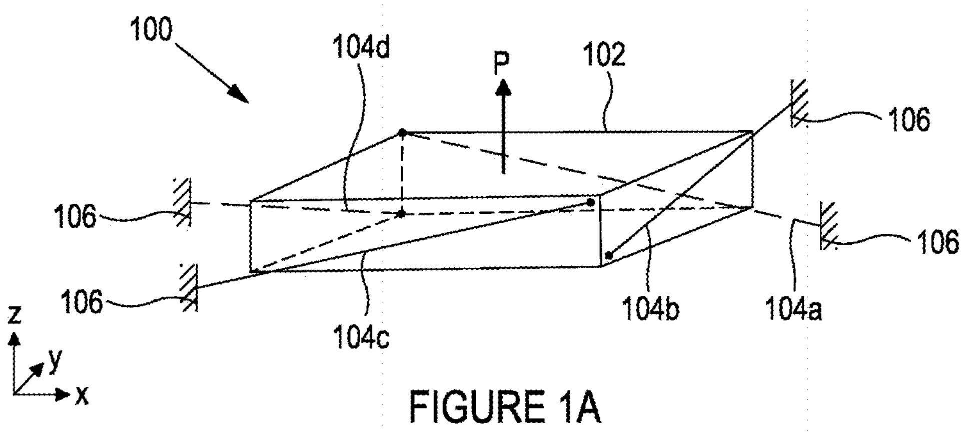
FIGS. 1A to 1C show perspective views of three SMA actuation apparatus having different arrangements of four SMA actuator wires.

Broadly speaking, embodiments of the present techniques provide shape memory alloy (SMA) actuation apparatus for moving a moveable component relative to a static component or support structure and along a notional primary axis. The SMA actuation apparatus may comprise a biasing element to resist motion of the moveable component in particular directions relative to the primary axis, or may comprise an arrangement of SMA actuator wires that provides the biasing function.

The SMA actuation apparatus described herein may be used to provide positional control of a wide range of types of moveable component. One particular non-limiting example is the use of the SMA actuation apparatus to provide a camera with optical image stabilisation (OIS). In this case, the primary axis is the optical axis of the lens or lens stack of the camera. The SMA actuation apparatus may be used to drive tilting of the lens (or lens stack, or indeed the whole of a camera unit). Tilting may provide stabilisation against blur caused by tilts or translations orthogonal to the optical axis. The SMA actuation apparatus may be used to drive movement of the lens laterally to the optical axis, and this lateral movement may provide stabilisation against blur caused by tilts or translations orthogonal to the optical axis. The SMA actuation apparatus may be used to provide a camera with OIS and with movement of the camera lens along the optical axis for, for example, focusing.

International Patent Publication No. WO2011/104518 describes an SMA actuation apparatus which uses eight SMA actuator wires to provide positional control of a moveable element with multiple degrees of freedom. However, the present applicant has determined focusing and OIS can be achieved using only four wires in combination with a biasing element. This is advantageous because fewer wires means the SMA actuation apparatus may be cheaper and simpler to manufacture.

The present techniques are now described in more detail with reference to the Figures. In each case, a moveable component 102 is supported on or by a support structure 106 by four or more SMA actuator wires 104*a-h*. The arrangement of the SMA actuator wires 104*a-h* may vary but common elements have common reference numerals.

Figure 1B:
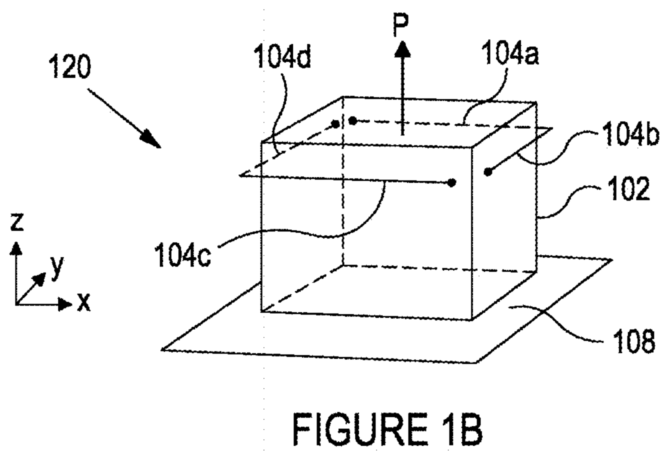
Figure 1C:
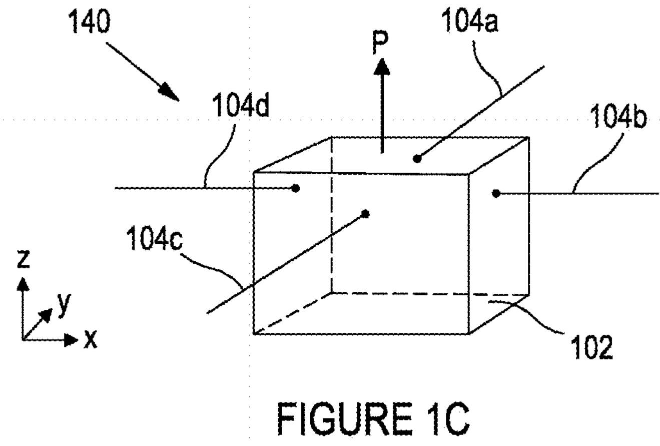

FIGS. 1A to 1C show perspective views of three SMA actuation apparatus 100, 120, 140 having different arrangements of four SMA actuator wires. SMA actuation apparatus 100, 120, 140 comprises a moveable component 102 which may in general be any type of component. In each apparatus 100, 120, 140, the moveable component 102 is shown as having a square or rectangular shape as viewed along a primary axis P, but it will be understood the moveable component 102 could have any shape. In each apparatus, support structure 106 supports the moveable component 102 in a manner allowing movement of the moveable component 102 relative to the support structure. In the arrangements shown in FIGS. 1A to 1C, the moveable component 102 is supported on the support structure 106 solely by the SMA actuator wires 104*a-d*, but in principle, the SMA actuation apparatus 100 could comprise a suspension system additionally supporting the moveable component 102 on the support structure 106.

Each SMA actuator wire 104*a-d* comprises a piece of SMA wire connected at one end to the moveable component 102 and at its other end to the support structure 106, possibly via an intermediate component. Any suitable means to mechanically and electrically connect the SMA actuator wires 104*a-d* to the moveable component 102 and the support structure 106.

In FIG. 1A, the SMA actuator wires 104*a-d* are inclined with respect to the primary axis P. In cases where the moveable component is or comprises a lens, the primary axis P may be the optical axis of the lens. Specifically, the SMA actuator wires 104*a-d* are inclined at an angle relative to a plane perpendicular to the primary axis. When SMA actuator wires 104*b* and 104*d* are powered and heated, they contract and cause the moveable component 102 to move. Since the wires are inclined, when SMA actuator wire 104*b* contracts, it applies a force to the moveable component 102 with force components in the +y direction and the +z direction, while when SMA actuator wire 104*d* contracts, it applies a force to the moveable component 102 with force components in the −y direction and the +z direction. If SMA actuator wires 104*b* and 104*d* contract by the same amount, the moveable component would be caused to rotate about the z axis (i.e. the primary axis P). However, the SMA actuation apparatus comprises a biasing element (not shown here) to resist rotation of the moveable component about the primary axis P. Accordingly, in the SMA actuation apparatus 100, when SMA actuator wires 104*b* and 104*d* contract by the same amount, the moveable component 102 is not able to rotate about the primary axis/z axis, and therefore is forced, by the biasing element, to move along the primary axis/z axis instead. The biasing element may be shaped or structured to cause any attempted rotation to be converted into movement along the primary axis instead. This motion could be used to achieve auto-focus/focusing in embodiments where the moveable component 102 is a camera lens or camera unit.

Similarly, in FIG. 1A, if SMA actuator wires 104*b* and 104*d* contract by different amounts (because, for example, they are supplied with different powers), the force exerted by one wire will be greater than the force exerted by another wire. Thus, again the moveable component may be caused to move along the y axis. However, the biasing element resists movement of the moveable component along the y axis. Accordingly, in the SMA actuation apparatus 100, when SMA actuator wires 104*b* and 104*d* contract by different amounts, the moveable component 102 is forced to tilt about the x axis. The direction of the tilting about the x axis may depend on which wire contracts more and/or the shaping/structure of the biasing element. This motion could be used to achieve lens tilt OIS in embodiments where the moveable component 102 is a camera lens or camera unit. For completeness, it is noted that if SMA actuator wires 104*a* and 104*c* contract by different amounts, the moveable component 102 is forced to tilt about the y axis, for the same reasons.

In FIG. 1B, the SMA actuator wires 104*a-d* of SMA actuation apparatus 120 are parallel to the plane perpendicular to the primary axis. That is, in the Figure, the SMA actuator wires 104*a-d* are parallel to the x-y plane, which is perpendicular to the x axis. Each SMA actuator wire 104*a-d* is connected at one end (represented by a dot) to the moveable component 102, and at another end to the support structure (not shown for the sake of simplicity). The SMA actuation apparatus 120 comprises a biasing element 108 to resist translation of the moveable component 102 in a plane perpendicular to the primary axis and to resist rotation of the moveable component 102 about the primary axis. The biasing element 108 is shown here as being provided below or around the bottom of the moveable component 102. However, it will be understood that the biasing element 108 may be provided above or around the top of the moveable component 102, or around the centre/middle of the moveable component 102.

In this embodiment, the moveable component 102 is not able to move along primary axis P because the SMA actuator wires 104*a-d* are not inclined with respect to the plane perpendicular to the primary axis. That is, the SMA actuator wires 104*a-d* only exert a force on the moveable component 102 along the x and y axes because they are not inclined, and so there is no component of force along the z axis. Thus, in embodiments where the moveable component 102 is or comprises a lens, auto-focus is not possible as the lens is unable to move along the z axis/primary axis P.

When SMA actuator wires 104*a* and 104*c*, which are coupled to opposite sides of the moveable component 102, are caused to contract, they try to move the moveable component 102 along the x axis. Specifically, SMA actuator wire 104*c* exerts a force on the moveable component 102 in the −x direction and SMA actuator wire 104*a* exerts a force on the moveable component 102 in the +x direction. Since the biasing element 108 restricts motion of the moveable component 102 along the x axis, the combination of the biasing element 108 and the force exerted by the SMA actuator wires 104*a,c* cause the moveable component to tilt about the y axis. Similarly, when SMA actuator wires 104*b* and 104*d*, which are coupled to opposite sides of the moveable component 102, are caused to contract, they try to move the moveable component 102 along the y axis. Specifically, SMA actuator wire 104*d* exerts a force on the moveable component 102 in the −y direction and SMA actuator wire 104*b* exerts a force on the moveable component 102 in the +y direction. Since the biasing element 108 restricts motion of the moveable component 102 along the y axis, the combination of the biasing element 108 and the force exerted by the SMA actuator wires 104*d,b* cause the moveable component to tilt about the x axis. Thus, in embodiments where the moveable component 102 is or comprises a lens, OIS is possible by tilting the lens.

It will be understood that the biasing element 108 may not be necessary in the arrangement of FIG. 1B to prevent rotation about the primary axis (z axis). This is because the SMA actuator wires 104*a-c* are not angled/inclined relative to the z axis and such there is no movement of the moveable component 102 along the primary axis. In this arrangement, it is only desirable or necessary to constrain or limit movement along the x and y axes, and thus, it may be possible to achieve this without the biasing element 108.

In FIG. 1C, each of the SMA actuator wires 104*a-d* of SMA actuation apparatus 140 are tangential to a side of the moveable component 102. Each SMA actuator wire 104*a-d* is connected at one end (represented by a dot) to the moveable component 102, and at another end to the support structure (not shown for the sake of simplicity).

In this embodiment, the moveable component 102 is not able to move along primary axis P because the SMA actuator wires 104*a-d* are not inclined with respect to the plane perpendicular to the primary axis. That is, the SMA actuator wires 104*a-d* only exert a force on the moveable component 102 along the x and y axes because they are not inclined, and so there is no component of force along the z axis. Thus, in embodiments where the moveable component 102 is or comprises a lens, auto-focus is not possible as the lens is unable to move along the z axis/primary axis P.

When SMA actuator wires 104*a* and 104*c*, which are coupled to opposite sides of the moveable component 102, are caused to contract, they try to move the moveable component 102 along the y axis. Specifically, SMA actuator wire 104*c* exerts a force on the moveable component 102 in the −y direction and SMA actuator wire 104*a* exerts a force on the moveable component 102 in the +y direction. The SMA actuation apparatus 140 comprises a biasing element (not shown), similar to that described above with respect to FIG. 1B. Since the biasing element restricts motion of the moveable component 102 along they axis, the combination of the biasing element 108 and the force exerted by the SMA actuator wires 104*a,c* cause the moveable component to tilt about the x axis. Similarly, when SMA actuator wires 104*b* and 104*d*, which are coupled to opposite sides of the moveable component 102, are caused to contract, they try to move the moveable component 102 along the x axis. Specifically, SMA actuator wire 104*d* exerts a force on the moveable component 102 in the −x direction and SMA actuator wire 104*b* exerts a force on the moveable component 102 in the +x direction. Since the biasing element 108 restricts motion of the moveable component 102 along the x axis, the combination of the biasing element 108 and the force exerted by the SMA actuator wires 104*d,b* cause the moveable component to tilt about the y axis. Thus, in embodiments where the moveable component 102 is or comprises a lens, OIS is possible by tilting the lens.

It will be understood that a biasing element may not be necessary in the arrangement of FIG. 1C to prevent rotation about the primary axis (z axis). This is because the SMA actuator wires 104*a-c* are not angled/inclined relative to the z-axis and such there is no movement of the moveable component 102 along the primary axis. In this arrangement, it is only desirable or necessary to constrain or limit movement along the x and y axes, and thus, it may be possible to achieve this without the biasing element.

FIGS. 1A-C merely show some non-limiting example arrangements of SMA actuator wires, and it will be understood that there may be other arrangements that can achieve the same effects. For example, another arrangement may comprise wires which are all inclined in the same direction. This could be achieved by taking the arrangement of FIG. 1B and angling/inclining all the SMA actuator wires 104*a-d* downwards from their attachment point to the moveable component 106. (For reference, in FIG. 1A, two wires 104*b,d* are inclined upwards and two wires 104*a,c* are inclined downwards from their attachment point to the moveable component 106). In such an arrangement, a biasing element 108 may be required to limit motion about the z-axis. In another example, the wires of FIG. 1C could be inclined. For instance, in FIG. 1C, wires 104*b,d* could be inclined upwards, and wires 104*a,c* could be inclined downwards.

Figure 2A:
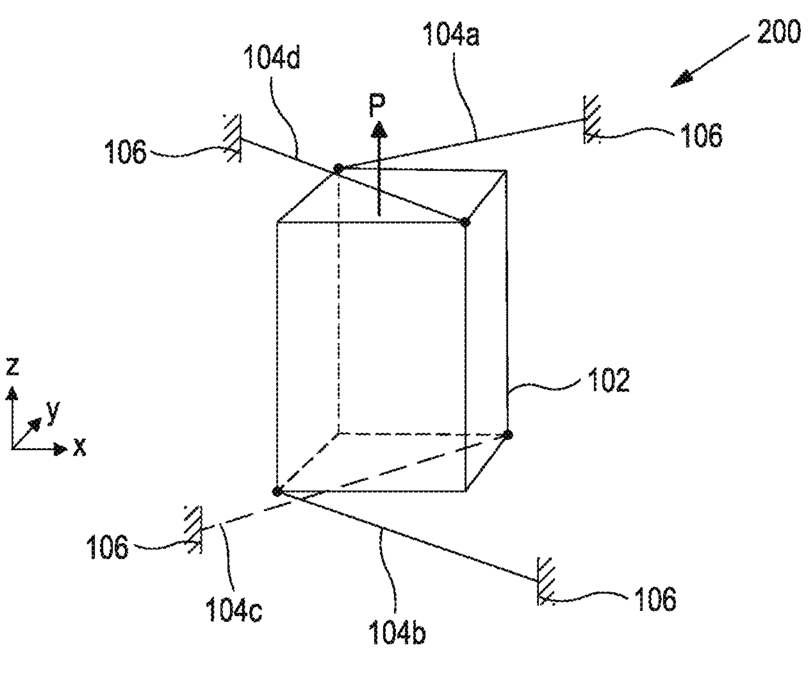
FIGS. 2A and 2B show perspective views of two SMA actuation apparatus having different arrangements of four SMA actuator wires.
Figure 2B:
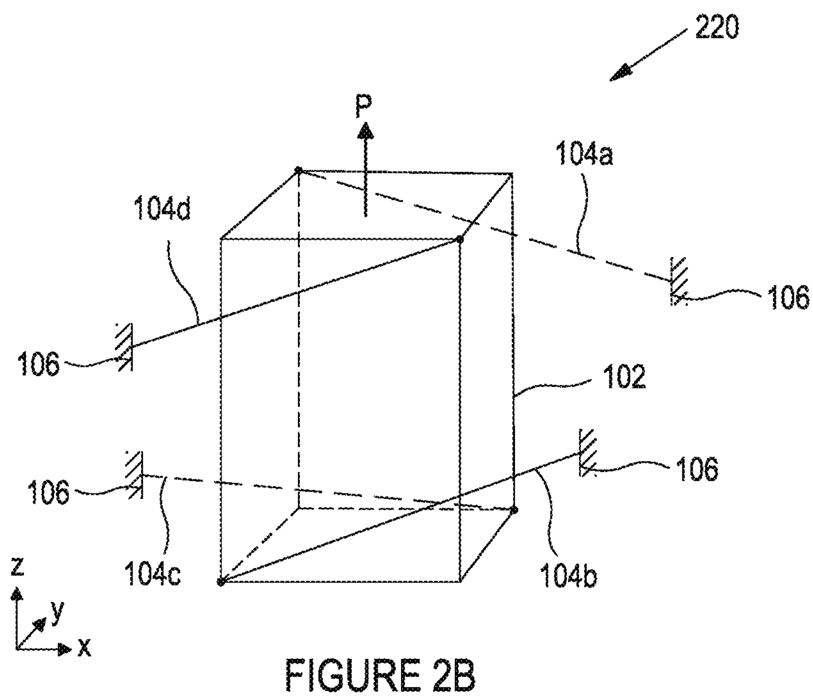

FIGS. 2A and 2B show perspective views of two SMA actuation apparatus 200, 220 having different arrangements of four SMA actuator wires. Here, the moveable component 102 is larger (e.g. longer or taller) than the moveable component shown in FIG. 1A. In embodiments where the moveable component 102 is a camera lens, the lens in FIG. 1A may have a z height of 4 mm, while the lens in FIGS. 2A and 2B may be a telephoto lens that may have a z height of 8 mm. It will be understood that these are merely example dimensions used for illustrative purposes, and are non-limiting. The arrangement of SMA actuator wires shown in FIGS. 2A and 2B may be used for any type or size of lens. However, the arrangement shown in FIG. 2A may not be suitable for miniature cameras where there is a desire to have a low z height camera and camera actuation apparatus.

In FIGS. 2A and 2B, the four SMA actuator wires 104*a-d* are arranged on two opposite sides of the moveable component 102. In SMA actuation apparatus 200, the SMA actuator wires 104*a-d* extend above and below the moveable component 102, whereas the SMA actuation apparatus 220 has a more compact arrangement of actuator wires. The operation of the SMA actuation apparatus 200, 220 is similar to that of the apparatus shown in FIGS. 1A-C.

In FIG. 2A, the SMA actuator wires 104*a-d* are inclined with respect to the primary axis P. In cases where the moveable component is or comprises a lens, the primary axis P may be the optical axis of the lens. Specifically, the SMA actuator wires 104*a-d* are inclined at an angle relative to a plane perpendicular to the primary axis. When SMA actuator wires 104*a* and 104*d* are powered and heated, they contract and apply forces to the moveable component 102, with components of force along the z and x axes. If SMA actuator wires 104*a* and 104*d* contract by the same amount, the moveable component would be caused to rotate about the z axis (i.e. the primary axis P). However, the SMA actuation apparatus comprises a biasing element (not shown here) to resist rotation of the moveable component about the primary axis P. Accordingly, in the SMA actuation apparatus 200, when SMA actuator wires 104*a* and 104*d* contract by the same amount, the moveable component 102 is not able to rotate about the primary axis/z axis, and therefore is forced, by the biasing element, to move along the primary axis/z axis instead. The biasing element may be shaped or structured to cause any attempted rotation to be converted into movement along the primary axis instead. This motion could be used to achieve auto-focus/focusing in embodiments where the moveable component 102 is a camera lens or camera unit.

In FIG. 2A, if SMA actuator wires 104*d* and 104*b* are powered, the moveable component 102 may be caused, by the contraction of the SMA actuator wires and the presence of a biasing element (which resists translation along the y axis), to tilt about the y axis in one direction. If SMA actuator wires 104*a* and 104*c* are powered, the moveable component 102 may be caused, by the contraction of the SMA actuator wires and the presence of a biasing element, to tilt about the y axis in the opposite direction.

In FIG. 2A, if SMA actuator wires 104*a* and 104*b* are powered, the moveable component 102 may be caused, by the contraction of the SMA actuator wires and the presence of a biasing element (which resists translation along the x axis), to tilt about the x axis in one direction. If SMA actuator wires 104*c* and 104*d* are powered, the moveable component 102 may be caused, by the contraction of the SMA actuator wires and the presence of a biasing element, to tilt about the x axis in the opposite direction.

Similarly, in FIG. 2B, the combination of the contraction of SMA actuator wires 104*b* and 104*c* and a biasing element may cause the moveable component to move along the primary axis P/z axis. If SMA actuator wires 104*d* and 104*b* are powered, the moveable component 102 may be caused, by the contraction of the SMA actuator wires and the presence of a biasing element (which resists translation along the y axis), to tilt about the y axis in one direction. If SMA actuator wires 104*a* and 104*c* are powered, the moveable component 102 may be caused, by the contraction of the SMA actuator wires and the presence of a biasing element, to tilt about the y axis in the opposite direction. If SMA actuator wires 104*a* and 104*b* are powered, the moveable component 102 may be caused, by the contraction of the SMA actuator wires and the presence of a biasing element (which resists translation along the x axis), to tilt about the x axis in one direction. If SMA actuator wires 104*c* and 104*d* are powered, the moveable component 102 may be caused, by the contraction of the SMA actuator wires and the presence of a biasing element, to tilt about the x axis in the opposite direction.

Thus, the present techniques provide a shape memory alloy (SMA) actuation apparatus comprising: a support structure; a moveable component moveable relative to the support structure; at least four SMA actuator wires connected between the moveable component and the support structure and arranged to move the moveable component relative to the support structure; and a biasing element to resist translation of the moveable component in a plane perpendicular to a notional primary axis and to resist rotation of the moveable component about the primary axis.

In embodiments, two pairs of wires may provide a force on the moveable component with a component of force in opposite directions along the primary axis.

In embodiments, the biasing element may resist rotation of the moveable component about the primary axis.

In embodiments, each SMA actuator wire may be inclined with respect to the primary axis. In particular, each SMA actuator wire may be inclined at an angle relative to the plane perpendicular to the primary axis. Alternatively, each SMA actuator wire may be parallel to the plane perpendicular to the primary axis. Further alternatively, each SMA actuator wire may be tangential to a side of the moveable component.

In some embodiments, one SMA actuator wire of the at least four SMA actuator wires may be provided on each side of the moveable component. Alternatively, two SMA actuator wires may be provided on two opposite sides of the moveable component. In this case, on each side, the two SMA actuator wires may be parallel to one another, or may be inclined in opposite senses with respect to each other and cross.

Figure 3:
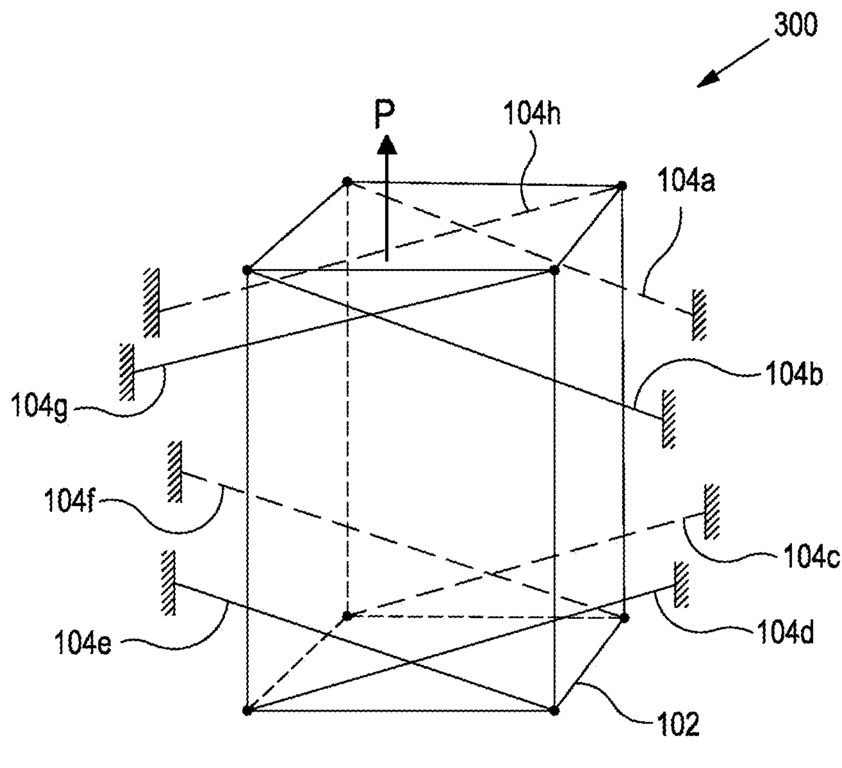
FIG. 3 is a perspective view of an SMA actuation apparatus having eight SMA actuator wires.

FIG. 3 is a perspective view of an SMA actuation apparatus 300 having eight SMA actuator wires 104*a-h*. In this embodiment, the eight SMA actuator wires 104*a-h* may be used to move both the moveable component 102 in particular desired directions, while resisting movement in other directions. In this way, a separate biasing element may not be required. The moveable component 102 may be any object. In particular embodiments, the moveable component 102 in apparatus 300 may be a telephoto lens.

Thus, the present techniques provide a shape memory alloy (SMA) actuation apparatus comprising: a support structure 106; a moveable component 102 moveable relative to the support structure 106; and eight SMA actuator wires 104*a-h* connected between the moveable component and the support structure so that on contraction two groups of four SMA actuator wires provide a force on the moveable component with a component in opposite directions along a notional primary axis, while resisting translation of the moveable component in a plane perpendicular to the primary axis and resisting rotation of the moveable component about the primary axis.

In embodiments, each SMA actuator wire 104*a-h* may be inclined at an angle relative to the plane perpendicular to the primary axis P.

In embodiments, two of the eight SMA actuator wires 104*a-h* may be provided on each side of the moveable component. That is, two SMA actuator wires may be coupled to each of the four sides of the moveable component 102. Alternatively, two pairs of crossed wires may be provided on opposite sides of the moveable component 102, as shown in FIG. 3. The wires may extend above and below the moveable component 102 (c.f. FIG. 2A) or may be arranged in a more compact arrangement (c.f. FIG. 2B).

It will be understood that FIG. 3 shows one non-limiting example arrangement of eight SMA actuator wires, and that there may be other arrangements that can achieve the same effect. For example, instead of having two pairs of crossed wires on two opposite sides of the moveable component 102 (as shown in FIG. 3), two pairs of crossed wires may be provided on each side of the moveable component 102. For example, SMA actuator wires 104*e* and 104*d* may be moved to one of the sides of the moveable component that in FIG. 3 does not have any wires, and wires 104*a* and 104*h* may be moved to the other such side of the moveable component.

Figure 4A:
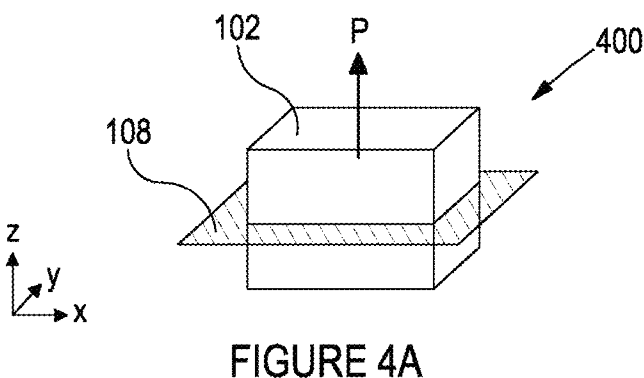
FIGS. 4A to 4C show schematic views of three SMA actuation apparatus having at least one biasing element.
Figure 4B:
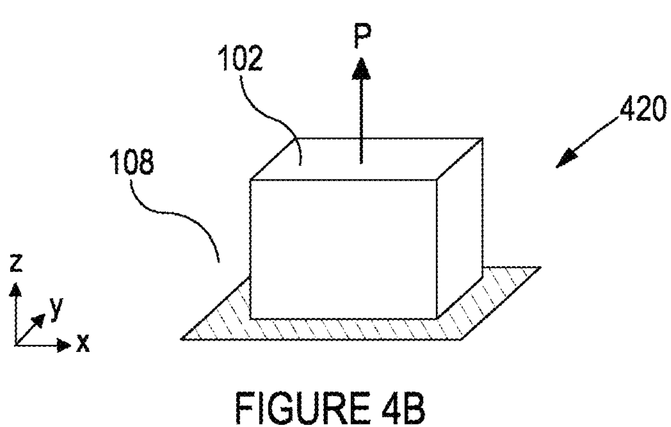
Figure 4C:
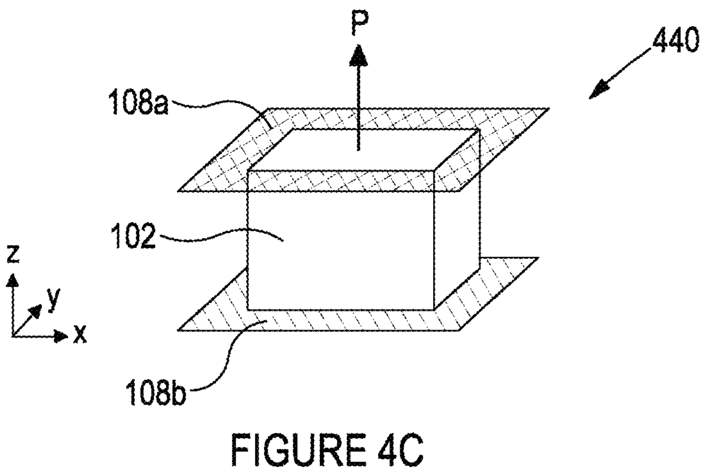

FIGS. 4A to 4C show schematic views of three SMA actuation apparatus 400, 420, 440 having at least one biasing element. The SMA actuator wires and the support structure are not shown here for the sake of simplicity. In FIG. 4A, biasing element 108 is provided around the centre or middle of the moveable component 102. In FIG. 4B, biasing element 108 is provided below or around the base/bottom of the moveable component 102. It will be understood that the biasing element 108 could alternatively be provided above or around the top of the moveable component 102. In FIG. 4C, the at least one biasing element 108 comprises a first biasing element 108*a* provided above or around the top of moveable component 102, and a second biasing element 108*b* provided below or around the base of moveable component 102. It will be understood that the arrangements of the biasing element(s) shown here may be combined with any of the SMA actuation apparatus shown in FIGS. 1A to 2B.

Figure 5:
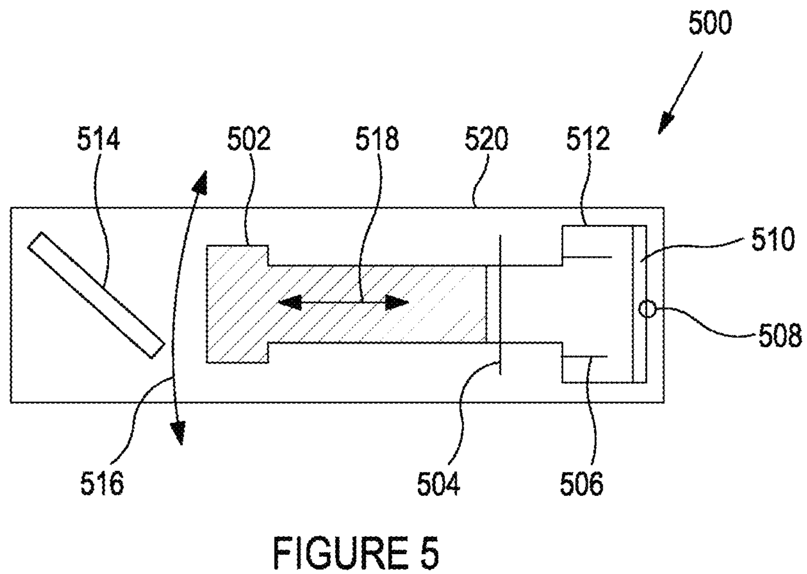
FIG. 5 shows a schematic diagram of an SMA actuation apparatus for moving a telephoto lens.

FIG. 5 shows a schematic diagram of an SMA actuation apparatus for moving a telephoto lens 502 in a camera module 500. The camera module comprises a telephoto lens 502, an SMA actuation apparatus 504, and an image sensor 510. The camera module 500 may comprise a mirror 514, a sensor bracket 512 comprising autofocus bearing elements 506, and a point of rotation 508. Autofocus (AF) and optical image stabilisation (OIS) may be achieved using an 8-wire SMA actuation apparatus (such as that described in International Patent Publication No. WO2011/104518) with four wires removed. In this case, autofocus (i.e. movement of the telephoto lens 502 in the direction indicated by arrow 518) may be achieved by powering the four wires of the SMA actuation apparatus 504 together against a spring or other resilient element (not shown). Alternatively, AF could be achieved by having all 8 wires of an 8-wire actuator. The OIS functionality (i.e. sideways motion as indicated by arrow 516) may be achieved by pivoting or tilting the telephoto lens 502 about the point of rotation 508. This may be achieved by powering the wires of a four-wire or 8-wire actuator in the manner described above with respect to FIGS. 1A to 3. The tilt magnitude may be increased by moving the actuator 504 closer to pivot point 508.

The moving ends of the four SMA actuator wires (not shown) may be attached to a lens carriage (not shown). The lens carriage may comprise bearings connected to the chassis/sensor bracket 512 and the bearings enable the telephoto lens 502 to move in a direction that is substantially perpendicular to the plane of the image sensor 510. The chassis/sensor bracket 512 may be quite tall (~7 mm), such that it may be relatively easy to achieve good tilt performance. The image sensor pivot 508 opposes the AF motion and is connected to a camera body 520. The stationary ends of the 4 SMA wires are also connected to the camera body 520.

In embodiments, the image sensor 510 may be connected to a flexible printed circuit board (FPC). The FPC may need to bend through 90° within the camera body 520, which may allow bend and twist of the telephoto lens 502 to be accommodated.

Figure 6:
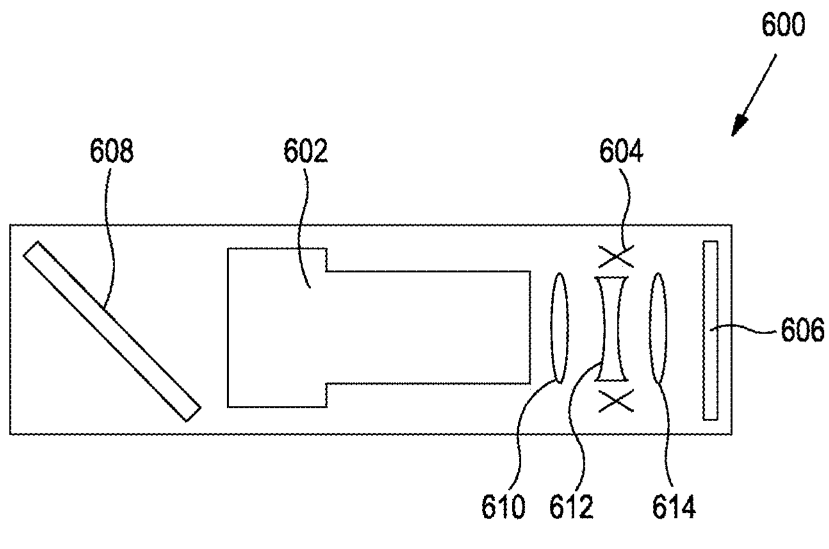
FIG. 6 shows a schematic diagram of another mechanism for moving a telephoto lens.

FIG. 6 shows a schematic diagram of another mechanism for moving a telephoto lens 602. AF and OIS may be achieved for telephoto lenses by moving an additional lens or array of lenses in the space between the telephoto lens and image sensor. This mechanism uses the otherwise empty space between a telephoto lens 602 and image sensor 606 to achieve AF and OIS, which may provide a more compact telephoto camera module 600. The camera module 600 comprises telephoto lens 602, actuator 604, image sensor 606, a mirror 608, and three lenses: a collector 610, a focal group 612 (to achieved AF and OIS), and a projector 614. Actuator 604 may be used to move the focal group lens 612 to achieve AF and OIS. The telephoto lens 602 may be held stationary relative to the image sensor 606 and mirror 608. The collector lens 610 and projector lens 614 may also be fixed/stationary.

In any of the SMA actuation apparatus described herein, the biasing element may have a stiffness that biases against rotation of the moveable component about the primary axis while permitting movement of the moveable component along the primary axis.

The biasing element may comprise at least one flexure.

The flexure may be provided around the centre of the moveable component and is parallel to the plane perpendicular to the primary axis. Additionally or alternatively, the flexure may be provided above or below the moveable component parallel to the plane perpendicular to the primary axis.

The at least one flexure may comprise a first flexure above the moveable component and a second flexure below the moveable component, where both the first and second flexures are parallel to the plane perpendicular to the primary axis. One of the first flexure and the second flexure may be stiffer than the other of the first flexure and second flexure. In the case where only one flexure is used, the flexure needs to be stiff. Generally speaking, the stiffness of the flexure(s) may need to be large with respect to the weight of the moveable component 102. Where more than one flexure is used, one flexure may need to be compliant in order to permit tilting of the moveable component 102.

The flexure(s) may comprise one or more flexure arms.

The SMA actuator wires may have electrical connections that allow each of the SMA actuator wires to receive a drive signal. The SMA actuation apparatus may further comprise control circuitry for supplying drive signals to the SMA actuator wires, the control circuitry being electrically connected to the SMA actuator wires via the at least one flexure. The control circuitry may be arranged to supply each SMA actuator wire with an independent drive signal.

Flexures may be imperfect, such that although they are designed to resist particular motions, they may permit a small degree of an undesired motion. Therefore, in embodiments, the control circuitry may be arranged to supply at least one SMA actuator wire with a signal to compensate for any undesired movement of the moveable component, for example, any movement in the plane perpendicular to the primary axis and/or any rotation of the moveable component about the primary axis.

In any of the above embodiments, the moveable component may be a camera lens such that the primary axis is the optical axis of the camera lens. In some cases, the moveable component may be a camera unit comprising an image sensor and a camera lens arranged to focus light on the image sensor. The camera lens may have a diameter of at most 20 mm. The camera lens may be a compound lens or a telephoto lens.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A shape memory alloy (SMA) actuation apparatus comprising:

a support structure;

a moveable component moveable relative to the support structure;

at least four SMA actuator wires connected between the moveable component and the support structure and arranged to move the moveable component relative the support structure; and a biasing element to resist translation of the moveable component in a plane perpendicular to a notional primary axis, wherein:

the SMA actuator wires are configured to only exert a force on the moveable component along an x axis and/or a y axis;

the x and y axes are perpendicular to the primary axis; and the combination of the biasing element and the force exerted by the SMA actuator wires cause the moveable component to tilt about the x axis and/or the y axis.

2. The SMA actuation apparatus as claimed in claim 1, wherein the biasing element further resists rotation of the moveable component about the primary axis.

3. The SMA actuation apparatus as claimed in claim 1, wherein the moveable component is a camera lens, and wherein the primary axis is the optical axis of the camera lens.

4. The SMA actuation apparatus as claimed in claim 3, wherein the camera lens has a diameter of at most 20 mm.

5. The SMA actuation apparatus as claimed in claim 3, wherein the camera lens is a compound lens or a telephoto lens.

6. The SMA actuation apparatus as claimed in claim 1, wherein the moveable component is a camera unit comprising an image sensor and a camera lens arranged to focus light on the image sensor, and wherein the primary axis is the optical axis of the camera lens.

7. The SMA actuation apparatus as claimed in claim 1, wherein each SMA actuator wire is inclined with respect to the primary axis.

8. The SMA actuation apparatus as claimed in claim 1, wherein each SMA actuator wire is parallel to the plane perpendicular to the primary axis.

9. The SMA actuation apparatus as claimed in claim 1, wherein each SMA actuator wire is tangential to a side of the moveable component.

10. The SMA actuation apparatus as claimed in claim 1, wherein one SMA actuator wire of the at least four SMA actuator wires is provided on each side of the moveable component.

11. The SMA actuation apparatus as claimed in claim 1, wherein two SMA actuator wires are provided on two opposite sides of the moveable component, and optionally wherein, on each side, the two SMA actuator wires are parallel to one another or are inclined in opposite senses with respect to each other and cross.

12. The SMA actuation apparatus as claimed in claim 1, wherein the biasing element comprises at least one flexure.

13. The SMA actuation apparatus as claimed in claim 12, wherein:

the flexure is provided around the centre of the moveable component and is parallel to the plane perpendicular to the primary axis; or the flexure is provided above or below the moveable component parallel to the plane perpendicular to the primary axis; or the at least one flexure comprises a first flexure above the moveable component and a second flexure below the moveable component, where both the first and second flexures are parallel to the plane perpendicular to the primary axis, preferably wherein one of the first flexure and the second flexure is stiffer than the other of the first flexure and second flexure.

14. The SMA actuation apparatus as claimed in claim 12, wherein the flexure comprises one or more flexure arms.

* * * * *